US009834046B2

(12) United States Patent
Nicolini et al.

(10) Patent No.: US 9,834,046 B2
(45) Date of Patent: Dec. 5, 2017

(54) TYRE-CHANGING MACHINE

(71) Applicant: SICAM S.R.L., Correggio (RE) (IT)

(72) Inventors: Roberto Nicolini, Correggio (IT); Marco Matteucci, Correggio (IT)

(73) Assignee: SICAM S.R.L., Correggio (IT)

( * ) Notice: Subject to any disclaimer, the term of this patent is extended or adjusted under 35 U.S.C. 154(b) by 311 days.

(21) Appl. No.: 14/417,990

(22) PCT Filed: Jul. 23, 2013

(86) PCT No.: PCT/IB2013/001599
§ 371 (c)(1),
(2) Date: Jan. 28, 2015

(87) PCT Pub. No.: WO2014/020395
PCT Pub. Date: Feb. 6, 2014

(65) Prior Publication Data
US 2015/0298514 A1    Oct. 22, 2015

(30) Foreign Application Priority Data
Jul. 31, 2012    (IT) .............................. MO2012A0191

(51) Int. Cl.
*B60C 25/05* (2006.01)
*B60C 25/138* (2006.01)

(52) U.S. Cl.
CPC ........ *B60C 25/0548* (2013.01); *B60C 25/056* (2013.01); *B60C 25/138* (2013.01)

(58) Field of Classification Search
CPC .. B60C 25/056; B60C 25/0548; B60C 25/138
(Continued)

(56) References Cited

U.S. PATENT DOCUMENTS 6,220,105 B1 *  4/2001  Cripe .................... G01L 1/125
                                                        73/862.333
8,635,917 B2 *  1/2014  Lee ....................... G01L 3/1435
                                                        73/862.331
(Continued)

FOREIGN PATENT DOCUMENTS

EP    1 479 538 A2    11/2004
EP    2 319 715 A1     5/2011

OTHER PUBLICATIONS

International Search Report, dated Nov. 21, 2013, from corresponding PCT application.

*Primary Examiner* — Hadi Shakeri
(74) *Attorney, Agent, or Firm* — Young & Thompson (57) ABSTRACT

A tire-changing machine include a base frame; a grip unit fitted on the base frame for revolving around a rotation axis and gripping a vehicle wheel having a rim and a tire to fit/remove; first operating elements for placing the grip unit in rotation around the axis; at least an operating head fitted on the base frame and having at least a work tool; second operating elements for positioning the operating head and the wheel in a work configuration wherein the tool contacts the tire; the grip unit including a first measuring portion subject to a stress condition due to the contact, in correspondence to the first measuring portion, first sensor elements for detecting the stress condition of the first measuring portion and operatively associated with a processing and control unit for determining a danger condition of the tire starting from the stress condition.

13 Claims, 6 Drawing Sheets

(58) Field of Classification Search
USPC .......................................................... 157/1.24
See application file for complete search history.

(56) References Cited

U.S. PATENT DOCUMENTS

| | | | | |
|---|---|---|---|---|
| 8,739,624 | B2* | 6/2014 | Sotgiu | G01M 1/225 73/462 |
| 8,770,254 | B1* | 7/2014 | Hanneken | B60C 25/138 157/1.17 |
| 2011/0100558 | A1* | 5/2011 | Corghi | B60C 25/056 157/1.1 |
| 2015/0251503 | A1* | 9/2015 | Sotgiu | B60C 25/132 157/1.24 |

* cited by examiner

TYRE-CHANGING MACHINE

TECHNICAL FIELD

The present invention relates to a tyre-changing machine for fitting and removing vehicle wheels.

BACKGROUND ART

It is known that the wheels of tyred vehicles consist of a cylindrical metal rim having, at the axial extremities, annular containment flanges between which is defined a channel for the slot-in fitting of a tyre.

In fitting configuration, the side portions of the tyre, so-called "beads", are abutted against the containment flanges.

Inside the tyre, an inner tube can be fitted or, in the case of "tubeless" type tyres, air under pressure can be directly introduced.

To perform the tyre fitting and removal operations onto and from the relative rims, so-called tyre-changing machines are currently used, which permit removing the tyre from the relative rim, e.g. to perform maintenance jobs or the replacement of the inner tube, the rim and/or the tyre itself, and then refitting the same tyre, or a substitute tyre on the wheel rim.

Traditionally, the tyre-changing machines are composed of a base frame supporting grip means and means for starting the rotation of the wheel rim on the machine.

The rotation axis of the grip means and the means for starting rotation can be vertical or horizontal depending on the type of tyre-changing machine.

One or more mobile operating heads are fitted on the base frame and have one or more work tools which cooperate to fit and/or remove the tyre onto and from the rim.

The work tools used have different shapes and dimensions depending on what they are used for.

Some tools, for example, are hook shaped and designed to be inserted between the tyre beads and the corresponding containment flanges of the rim to extract them from the rim channel during the removal phase.

Other tools, on the other hand, have a truncated-cone or cylindrical shape and are fitted in a rotatable way to act as pressing rollers designed to push the tyre beads towards the inside of the rim channel during the fitting phase or towards the outside during the removal phase.

The operating heads fitted on the tyre-changing machine are usually associated with automated operating means, such as pneumatic, hydraulic cylinders or the like, which allow performing the fitting and removal operation with a greater force than a human being.

The operator operates the machine by means of the operating controls governing the movement of the operating heads and the exact operation of the machine is achieved by means of the correct governing of the tools.

Such machines, nevertheless, have a number of drawbacks relating to the fact that they are not very practical to use when performing fitting and removal operations.

With traditional machines in fact, tool movement is inconveniently subject to the professional capacity, skill and experience of the operator.

In particular, it should be noted that some phases of the fitting and removal operations are particularly critical inasmuch as, unless they are correctly performed, the tyre undergoes tensioning and deformation such as to possibly negatively affect integrity and cause serious internal breakages.

Such critical state mostly occurs during operation of the hooked tools to extract the tyre bead from the rim channel and, above all, in the case of particularly delicate tyres such as lowered and runflat tyres.

It is therefore easy to appreciate that the skill of the operator in correctly moving the tools on the tyre represents a current functional limit of tyre-changing machines.

In this respect, furthermore, it is specified that the difficulty in controlling traditional tyre-changing machines inconveniently results in the fact that these can only be operated by skilled and suitably trained personnel, at a fairly heavy cost.

DESCRIPTION OF THE INVENTION

The main aim of the present invention is to provide a tyre-changing machine for fitting and removing vehicle wheels which is practical and functional to use and permits making it easier for the operator to perform the fitting and removal operations to the point that it can also be used by unskilled personnel, thus producing a considerable economic saving in terms of lower labour costs.

Another object of the present invention is to provide a tyre-changing machine for fitting and removing vehicle wheels which allows to overcome the mentioned drawbacks of the state of the art within the ambit of a simple, rational, easy and effective to use as well as low cost solution.

The above objects are achieved by the present tyre-changing machine for fitting and removing vehicle wheels, comprising:
  a base frame;
  at least a grip unit fitted on said base frame in a revolving way around a rotation axis and suitable for gripping at least a vehicle wheel having a rim and a tyre to fit/remove;
  first operating means suitable for placing in rotation said grip unit around said rotation axis;
  at least an operating head fitted on said base frame and having at least a work tool;
  second operating means suitable for positioning said operating head and said wheel in a work configuration wherein said work tool is arranged in contact against said tyre;
characterized by the fact that said grip unit comprises at least a first measuring portion subject to a stress condition due to the contact between said work tool and said tyre, in correspondence to said first measuring portion first sensor means being arranged which are suitable for detecting said stress condition of the first measuring portion and are operatively associated with at least a processing and control unit suitable for determining a condition of danger of said tyre starting from said stress condition

BRIEF DESCRIPTION OF THE DRAWINGS

Other characteristics and advantages of the present invention will become more evident from the description of a preferred, but not sole, embodiment of a tyre-changing machine for fitting and removing vehicle wheels, illustrated purely as an example but not limited to the annexed drawings in which.

EMBODIMENTS OF THE INVENTION

With particular reference to such figures, globally indicated by 1 is a tyre-changing machine for fitting and removing vehicle wheels.

The machine 1 comprises a base frame 2 for resting on the ground.

The base frame 2 supports a grip unit 3, 4, 5 revolving around a rotation axis A and suitable for gripping a vehicle wheel R.

Figure 1:
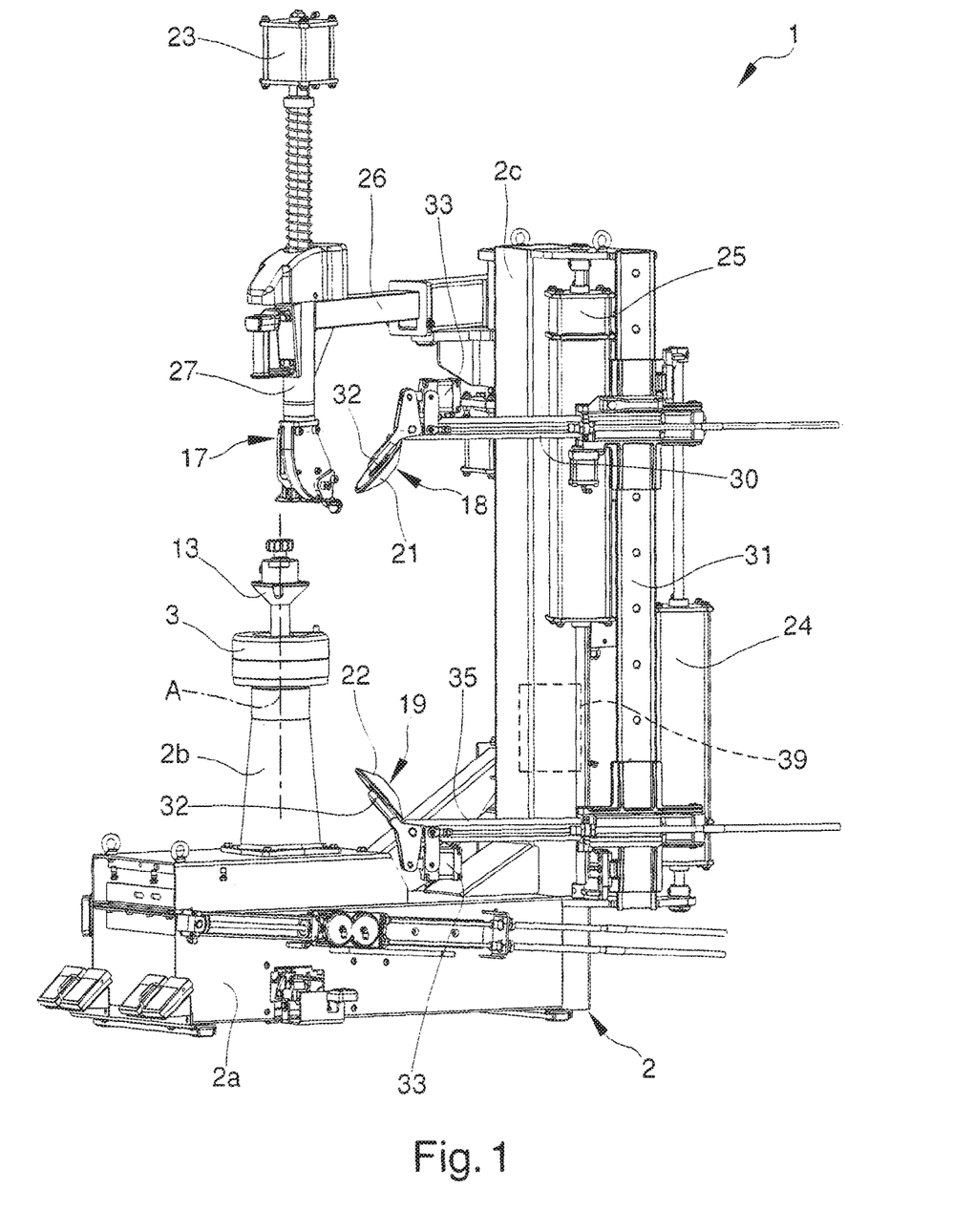
FIG. 1 is an axonometric view of the machine according to the invention.
Figure 2:
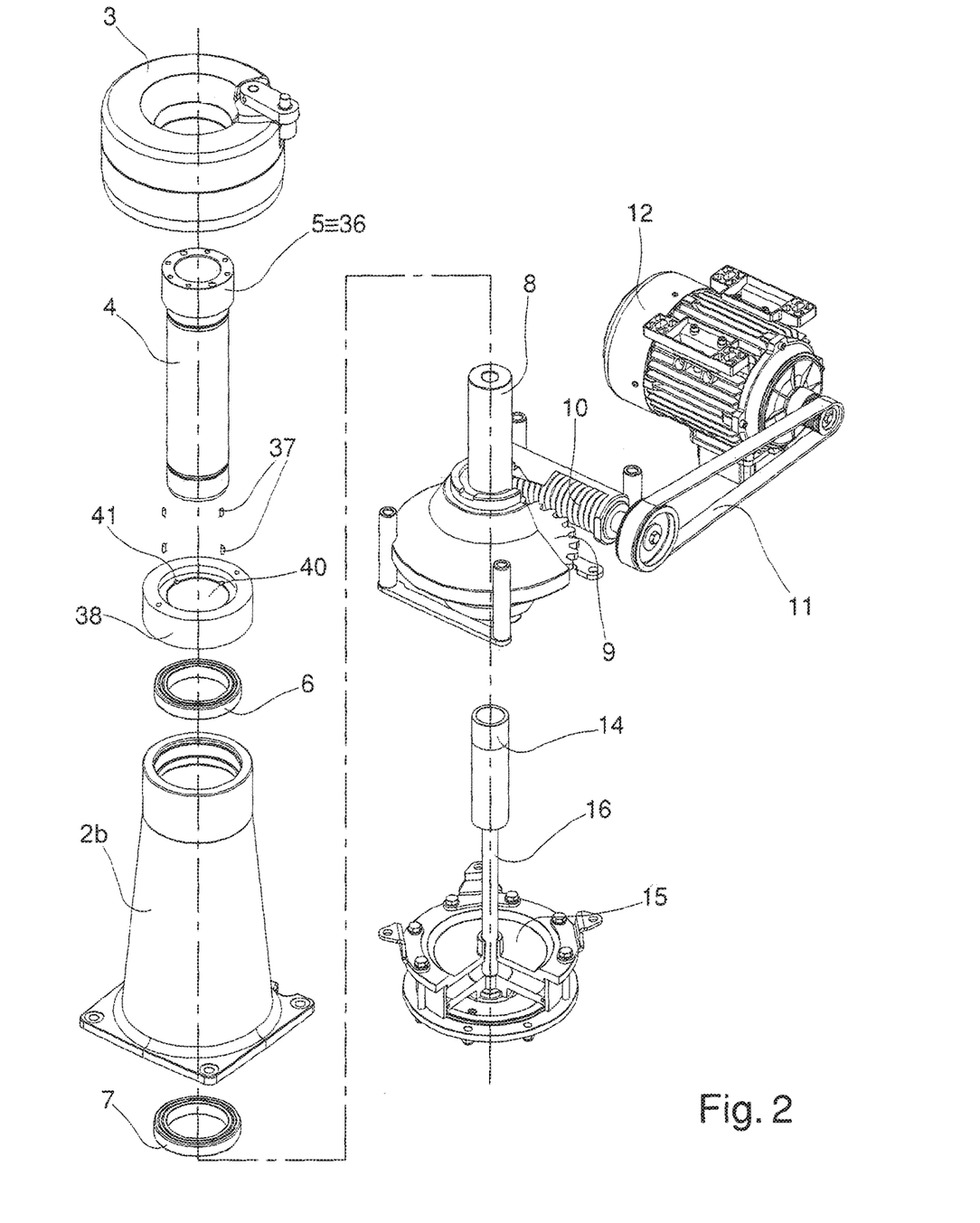
FIG. 2 is an exploded view of the grip unit and relative first operating means of the machine according to the invention.
Figure 3:
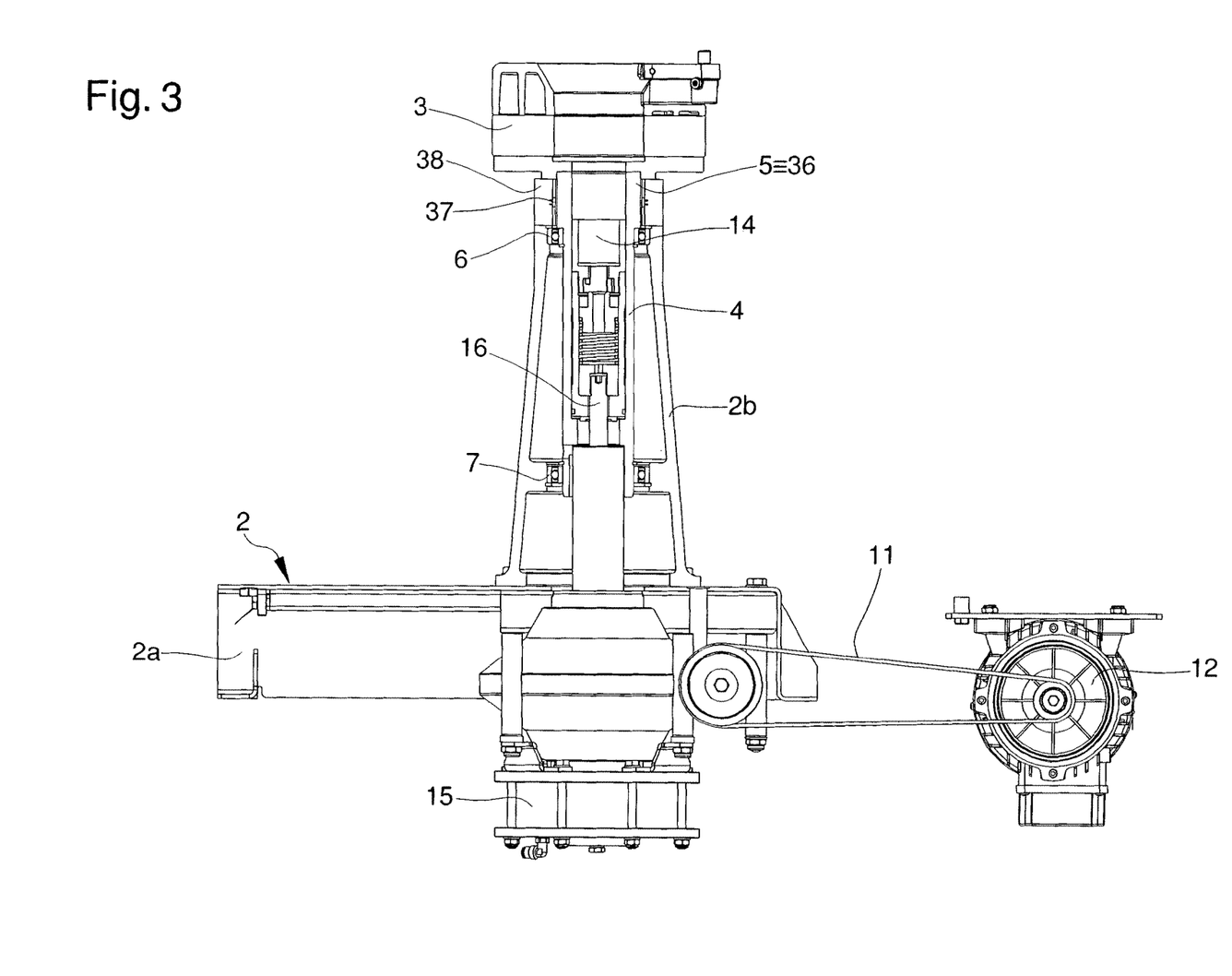
FIG. 3 is a section view of the grip unit and relative first operating means of the machine according to the invention.
Figure 4:
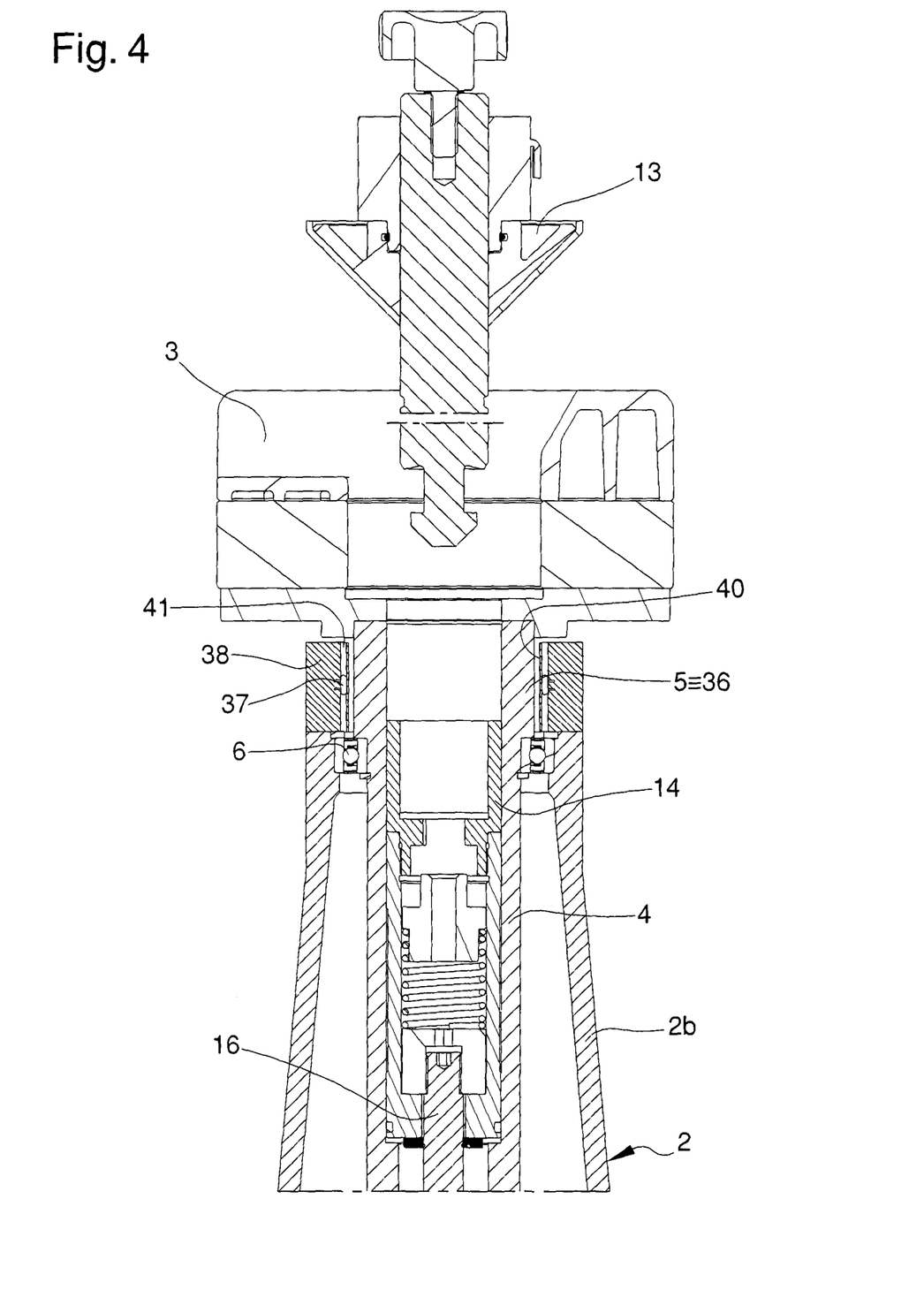
FIG. 4 is a section view, on an enlarged scale, of the grip unit of the machine according to the invention.
Figure 5:
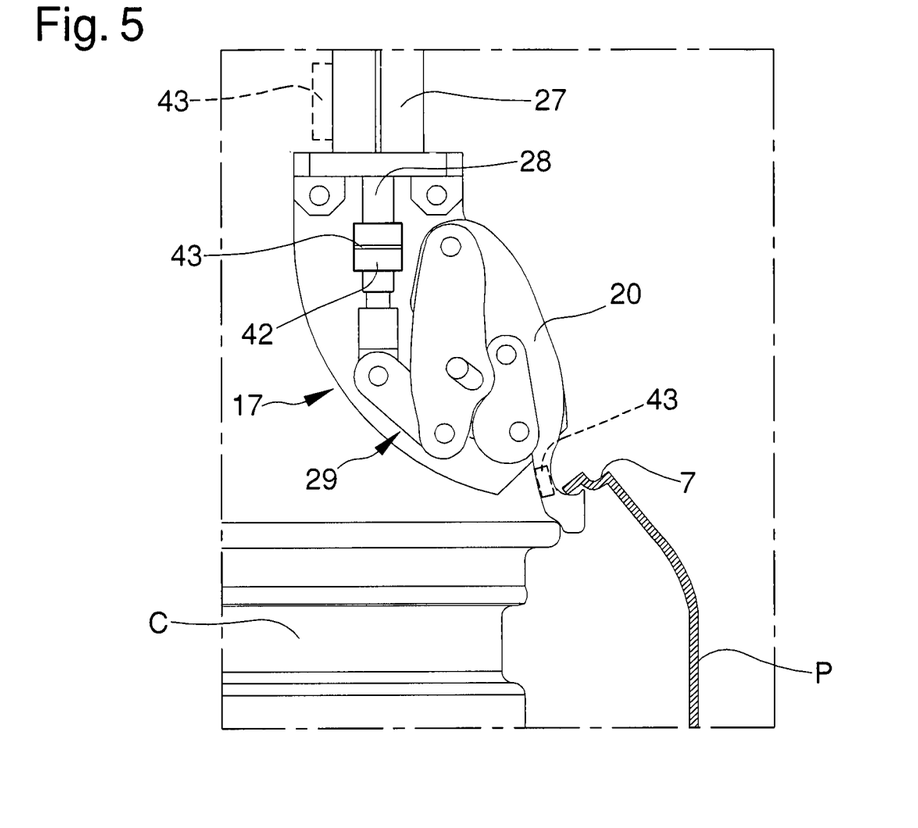
FIG. 5 is a section view of the first operating head of the machine according to the invention.

The wheel R, shown only in FIG. 5, is made up of an internal rim C and of a tyre P to be fitted and/or removed onto/from the rim C.

In the particular embodiment of the invention shown in the illustrations, the base frame 2 comprises a bed 2a and a column 2b standing from the bed 2a and on which the grip unit 3, 4, 5 is fitted in a rotatable way around a vertical rotation axis A; alternative embodiments cannot however be ruled out wherein the machine 1 has a grip unit 3, 4, 5 with horizontal or inclined rotation axis.

The grip unit 3, 4, 5 comprises a retention head 3 which allows retaining the rim C, and a shaft 4, 5, which supports the retention head 3.

The shaft 4, 5 is inserted in the column 2b and is associated with this by interposition of a proximal rotoidal bearing 6 and of a distal rotoidal bearing 7; in this respect, it is pointed out that, in this treatise, the adjectives "distal" and "proximal" are used with reference to the position of the retention head 3, and consequently the proximal rotoidal bearing 6 is the one highest and closest to the retention head 3, while the distal rotoidal bearing 7 is the one lowest and furthest away from the retention head 3.

Depending on the position of the rotoidal bearings 6, 7, the shaft 4, 5 is split into a first section 4, which extends substantially between the rotoidal bearings 6, 7, and into a second section 5, which extends beyond the proximal rotoidal bearing 6 and supports the retention head 3.

In the particular embodiment shown in the illustrations, wherein the rotation axis A is vertical, the second section 5 is clearly arranged above the first section 4.

At the base of the second section 5, the shaft 4, 5 is associated with a transmission system 8, 9, 10, 11 connected to first operating means 12 which are suitable for placing the grip unit 3, 4, 5 in rotation around the rotation axis A.

The transmission system 8, 9, 10, 11 comprises:
- a connection spindle 8 associated with the base of the shaft 4, 5;
- a ring gear 9 keyed to the connection spindle 8;
- a worm screw element 10 rotatable around an axis orthogonal to the rotation axis A and engaging with the ring gear 9; and
- a belt connection 11, joining the worm screw element 10 to the first operating means 12.

The first operating means 12, for example, are of the type of an electric motor, preferably a motor inverter, fitted on the base frame 2.

Alternative embodiments of the present invention cannot however be ruled out wherein the transmission system 8, 9, 10, 11 and the first operating means 12 are of a different type compared to the illustrated solution.

In the same way, the possibility cannot be ruled out of the transmission system 8, 9, 10, 11 not being fitted and the first operating means 12 being directly connected to the grip unit 3, 4, 5.

To lock the wheel R on the grip unit 3, 4, 5 a locking element 13 is provided insertable through the retention head 3 and the shaft 4, 5, which, for the purpose, are made hollow inside.

Once inserted in the shaft 4, 5, the locking element 13 can be connected to a locking unit 14, 15, 16 comprising a grip element 14, suitable for retaining the locking element 13, and a retention actuator 15, 16, of the type of a fluid jack (pneumatic or hydraulic).

The retention actuator 15, 16 comprises a liner 15, which is associated with the base frame 2 below the ring gear 9, and an actuator rod 16, which is coupled with the liner 15 and supports the grip element 14.

The retention actuator 15, 16, once activated, drags the locking element 13 downwards and, along with it, the rim C, which remains blocked between the retention head 3 and the locking element 13.

The base frame 2 also comprises a turret 2c which extends vertically from the bed 2a and which sustains at least an operating head 17, 18, 19.

The operating head 17, 18, 19 has at least a work tool 20, 21, 22 for fitting and/or removing the tyre P and is associated with second operating means 23, 24, 25, of the automated type, suitable for positioning the operating head 17, 18, 19 in a work configuration wherein the work tool 20, 21, 22 is arranged in contact against the tyre P.

The work tool 20, 21, 22 can consist of a hooked tool, a curved blade, a straight or another shape base insertable between the rim C and the beads T of the tyre P, or of a bead-breaking tool, a roller or a cone positionable so as to press and crush the beads T of the tyre P; more in general, the work tool 20, 21, 22 is any tool that goes into contact with the tyre P.

In the particular embodiment of the invention shown in the illustrations, the machine 1 has a plurality of operating heads 17, 18, 19, i.e., a first operating head 17, a second operating head 18 and a third operating head 19, having a first work tool 20, a second work tool 21 and a third work tool 22 respectively; alternative solutions cannot however be ruled out wherein the machine 1 has a different number of operating heads 17, 18, 19.

The first operating head 17 is mounted on a first arm 26 which extends substantially horizontal from the turret 2c and which supports a substantially vertical upright 27.

At the base of the upright 27 the first work tool 20 is arranged, which in detail consists of a mobile hooked tool to be inserted between the rim C and the tyre P, to grip the inner side of the bead T and extract it outside the edge of the rim C.

On the first operating head 17, the second operating means 23, 24, 25 are defined by a first linear actuator 23 suitable for pushing the first work tool 20 inside and outside the rim C.

The first linear actuator 23 consists of a fluid jack (hydraulic or pneumatic), arranged at the top of the upright 27 and provided with a mobile rod 28 which, by means of a kinematic system 29, transmits the movement to the first work tool 20.

The second operating head 18 comprises a second arm 30, which extends substantially horizontally and is fitted in a sliding way along a vertical guide 31 fitted on the turret 2c.

The second arm 30 has a free extremity in correspondence to which the second work tool 21 is fitted.

More in detail, the second work tool 21 is fitted on a bracket 32 which, with respect to the second arm 30, is rotatable around an axis horizontal and orthogonal to the second arm itself, so as to be able to change the inclination of the second work tool 21 with respect to the rim C.

The rotation of the second work tool 21 is achieved by means of a small cylinder 33, of the pneumatic or hydraulic type, having a shank 34 with a particularly short stroke which insists on the bracket 32.

The second work tool 21 consists, of a bead-breaking tool, with discoid shape, usable to press and crush one of the beads T of the tyre P.

In the case of the second operating head 18, the second operating means 23, 24, 25 are defined by a second linear actuator 24 suitable for pushing the second arm 30 along the vertical guide 31 to lift and lower the second arm 30 and, with it, the second work tool 21.

The second linear actuator 24 consists of a fluid jack (hydraulic or pneumatic) associated with the turret 2c.

The third operating head 19 is completely the same as the second operating head 18, with the only difference that, once the wheel R has been fitted on the machine 1, the second operating head 18 is ready to come into contact with the upper side of the wheel R, while the third operating head 19 is ready to come into contact with its lower side.

The third operating head 19, in fact, comprises a third arm 35, extending substantially horizontally and is fitted in a sliding way along the vertical guide 31.

The third arm 35 has a free extremity in correspondence to which, the third work tool 22 is fitted in a rotatable way around a horizontal axis orthogonal to the third arm 35, so as to be able to change its inclination with respect to the rim C.

The rotation of the third work tool 22 is obtained by means of a bracket 32 and a small cylinder 33 identical to those previously described.

The third work tool 22, like the second work tool 21, consists in a bead-breaking tool, of discoid shape, usable to press and crush the bead T of the tyre P arranged below.

In the case of the third operating head 19, the second operating means 23, 24, 25 are defined by a third linear actuator 25 suitable for pushing the third arm 35 along the vertical guide 31 to lift and lower the third arm 35 and, with it, the third work tool 22.

The third linear actuator 25 is also composed of a (hydraulic or pneumatic) fluid jack associated with the turret 2c.

During the operation of the work tools 20, 21, 22, the tyre P is deformed, often considerably; to avoid these deformations being such as to negatively affect its integrity, the machine 1 according to the invention has a control system which will be described below.

First of all, it is underlined that the grip unit 3, 4, 5 comprises at least a first measuring portion 36 which, due to the contact between the work tools 20, 21, 22 and the tyre P, is subject to a stress condition.

In this respect, it must be pointed out that, within the scope of the present treatise, by the term "stress condition" is meant that, during the fitting and/or the removal of the wheel R, some structural components of the machine 1 undergo an internal tension and/or dimensional deformation deriving from a state of torsion-bending and/or of compression/traction.

In correspondence to the first measuring portion 36 are arranged first sensor means 37, 38 which are suitable for detecting the stress condition of the first measuring portion 36 and are operatively associated with a processing and control unit 39 suitable for determining a condition of danger for the tyre P starting from the stress condition detected on the measuring portion.

Within the scope of the present treatise, by the term "condition of danger" is meant a condition wherein the tyre P, deformed by the work tools 20, 21, 22, is by now close to the point of breakage and risk of becoming damaged.

Usefully, the first measuring portion 36 is magnetized and, in its vicinity, produces a magnetic field.

Due to the magnetostrictive effect, the above magnetic field varies according to the stress condition undergone by the first measuring portion 36 and such variations can be measured.

For this purpose, the first sensor means 37, 38 comprise at least a magnetic field sensor 37 suitable for detecting, by magnetostrictive effect, the stress condition of the first measuring portion 36.

Usefully, the first measuring portion 36 is arranged in correspondence to the second section 5 of the shaft 4, 5, i.e., along the part of the shaft 4, 5 which, protruding from the proximal rotoidal bearing 6, undergoes greater tensioning and deformation.

Even more in detail, the first measuring portion 36 is arranged in the proximity of the proximal rotoidal bearing 6, i.e., at the point of the shaft 4, 5 wherein the stress condition is maximum and it is simpler, more practical and easy to detect the variations in the magnetic field due to magnetostrictive effect.

In the embodiment shown in the illustrations, in practice, the first measuring portion 36 coincides with the second section 5 of the shaft 4, 5.

It is also underlined that the shaft 4, 5 can only be magnetized in correspondence to the second section 5 or be magnetized in its entirety.

Advantageously, the first sensor means 37, 38 comprise a plurality of magnetic field sensors 37, of the magnetometer element type or the like, which detect the magnetic field of the first measuring portion 36 and transduce this into a corresponding electronic signal designed to be processed by the processing and control unit 39.

The magnetometer elements 37 are substantially arranged around the first measuring portion 36.

To keep the magnetometer elements 37 in the desired position, the first sensor means 37, 38 also comprise a ring-shaped body 38 arranged so as to surround the shaft 4, 5 and supporting the magnetometer elements 37.

For this purpose, the ring-shaped body 38, which is fitted at the top of the column 2b, comprises a central recess 40, wherein the shaft 4, 5 can be inserted without contact, and a plurality of axial cavities 41, wherein the magnetometer elements 37 are housed.

The magnetometer elements 37 and the relative axial cavities 41 are arranged in the proximity of the central recess 40 so as to be in the proximity of the first measuring portion 36 and make measuring its magnetic field easier.

The magnetometer elements 37 are distributed on the ring-shaped body 38 with a constant pitch and, preferably, there are four of them, arranged at 90° the one to the other.

The particular solution of providing four magnetometer elements 17 phase displaced by 90°, permits, on the one hand, precisely investigating the entire area around the first measuring portion 36 which is affected by its magnetic field and, on the other, electronically connecting the four magnetometer elements 37 to form an electric bridge to measure.

Taking into account the fact that the stresses induced on the tyre P by the work tools 20, 21, 22 discharge altogether onto the grip unit 3, 4, 5, the first sensor means 37, 38 are such as to virtually permit the detection of the condition of danger of the tyre P without further detections.

To permit a more detailed and precise detection, however, the operating heads 17, 18, 19 also comprise at least a second measuring portion 42 subject to a stress condition due to the contact between the work tools 20, 21, 22 and the tyre P, in correspondence to which second sensor means 43 are arranged which are suitable for detecting the stress condition of the second measuring portion 42 and are operatively associated with the processing and control unit 39.

In the case of the first operating head 17, e.g., the second measuring portion 42 is preferably defined by a section of the mobile rod 28, onto which is discharged the force of the first work tool 20 unless the kinematic reactions due to the kinematic system 29.

In the detail shown in FIG. 5, therefore, the second sensor means 43 are associated with the mobile rod 28.

Alternative embodiments cannot however be ruled out wherein the second sensor means 43 are fitted on different points of the first operating head 17 such as, e.g., on the first work tool 20 or on the upright 27; the second sensor means 43 in these alternative positions are shown in FIG. 5 by a dotted line.

In the case of the second operating head 18, on the other hand, the second measuring position 42 is preferably defined by a section of the bracket 32 on which the force of the second work tool 21 is discharged directly.

Figure 6:
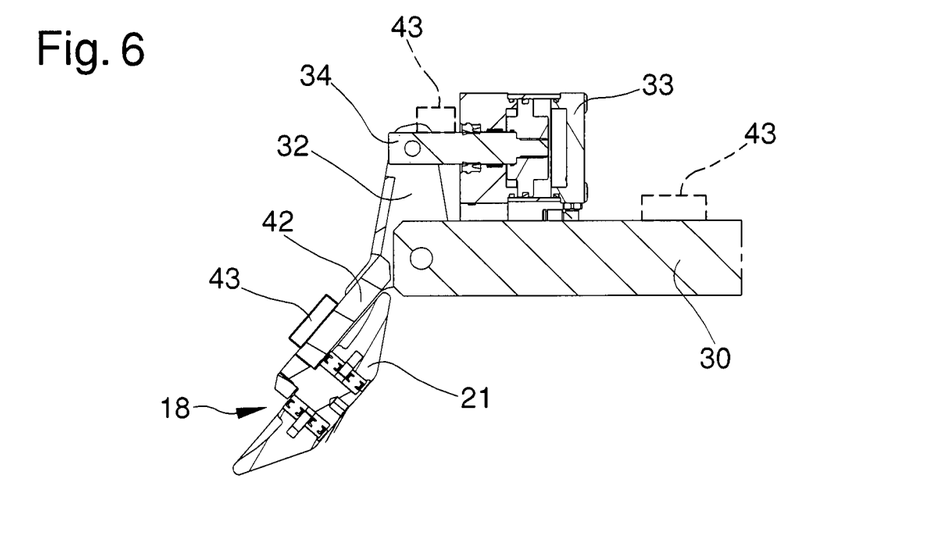
FIG. 6 is a section view of the second operating head of the machine according to the invention.
Figure 7:
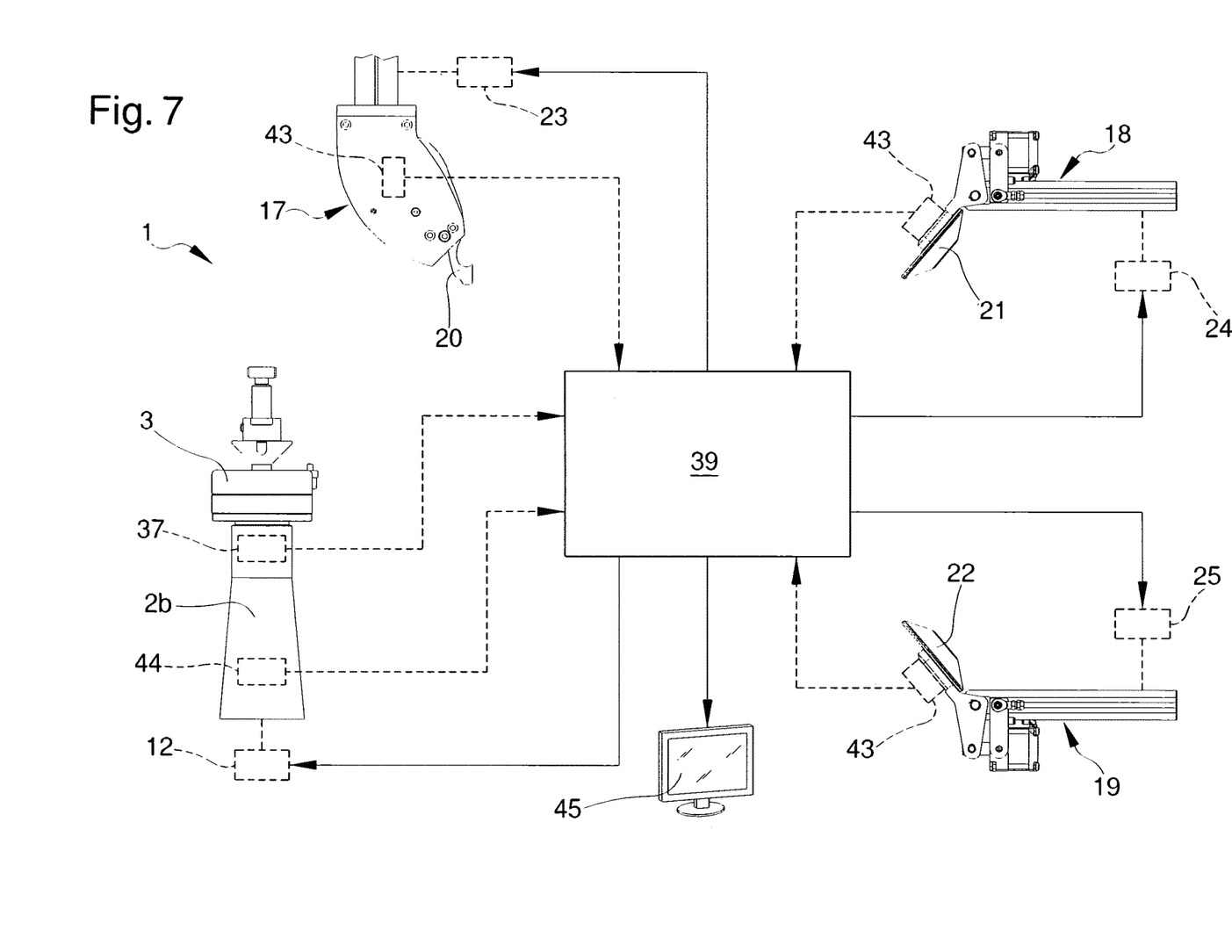
FIG. 7 is a schematic view which shows the operation of the machine according to the invention.

In the detail shown in FIG. 6, therefore, the second sensor means 43 are associated with the bracket 32.

Alternative embodiments cannot however be ruled out wherein the second sensor means 43 are fitted at different points of the second operating head 18 such as, e.g., on the second arm 30 or on the shank 34 of the small cylinder 33; the second sensor means 43, in these alternative positions, are shown in FIG. 6 by a dotted line.

Finally, as regards the third operating head 19, the considerations hold true expressed for the second operating head 18.

Usefully, the second sensor means 43 comprise a sensor element selected from the list comprising: force transducers, load cells, piezoelectric sensors, piezoresistive sensors, strainmeters, etc.

In the case of the solution shown in FIG. 5, e.g., where the force applied by the first work tool 20 discharges on the mobile rod 28 in the form of a normal traction force, the second sensor means 43 consist of a load cell inserted along the mobile rod 28.

In the case of the solution shown in FIG. 6, on the other hand, where the force applied by the second work tool 21 determines a torsion-bending state of the bracket 32, the second sensor means 43 preferably consist of a strain gauge associated with the bracket 32.

By combining the signals from the first sensor means 37, 38 and from the second sensor means 43, the processing and control unit 39 is able to determine whether the fitting/removal operation is occurring without stressing the tyre P excessively.

Advantageously, the processing and control unit 39 is also operatively associated with the third sensor means 44 which are suitable for detecting the angular position of the grip unit 3, 4, 5 revolving around the rotation axis A.

This way, the measurements taken by the first sensor means 37, 38 and by the second sensor means 43 can be placed in relation to the angular position of the wheel R, to identify which point of the tyre P has been most stressed.

The third sensor means 44, e.g., consist of an encoder or the like.

Furthermore, the processing and control unit 39 is associated with signaling means 45 suitable for warning the operator in the case of, during operation, a condition of danger occurs for the tyre P.

The signaling means 45 can be of the visual type, as in the case of a specific message which appears on the display screen, or of the acoustic type, as in the case of an acoustic alarm, or others still.

By means of the signalling means 45, the operator is warned of the fact that the tyre P is undergoing excessive tensioning which could negatively affect its integrity and that, therefore, the subsequent operations of the work tools 20, 21, 22 must be performed with particular care and attention.

To make it even easier for the operator, the processing and control unit 39 is advantageously associated with at least one between the first operating means 12 and the second operating means 23, 24, 25 and is suitable for controlling at least one of these to prevent the condition of danger from aggravating, i.e., to prevent the work tools 20, 21, 22 further stressing the tyre P.

For example, the processing and control unit 39 is suitable for defining a maximum rotation speed for the grip unit 3, 4, 5 and for controlling the first operating means 12 so that the speed of the grip unit 3, 4, 5 does not exceed the maximum rotation speed, reach the limit speed and stop rotation altogether.

Furthermore, the processing and control unit 39 is suitable for defining an end-stop position for the work tools 20, 21, 22 and for controlling the second operating means 23, 24, 25 so the work tools 20, 21, 22 do not go beyond such end-stop position, impeding for example all the commands given by the operator which would cause the first work tool 20 to pull the tyre P too much, or the second and third work tool 21, 22 to crush it too much, with risk of damaging it.

The invention claimed is:

1. Tyre-changing machine (1) for fitting and removing vehicle wheels, comprising:
   a base frame (2);
   a grip unit (3, 4, 5) fitted on said base frame (2) in a revolving way around a rotation axis (A) and for gripping a vehicle wheel (R) having a rim (C) and a tyre (P) to fit/remove;
   first operating means (12) for placing in rotation said grip unit (3, 4, 5) around said rotation axis (A);
   at least one an operating head (17, 18, 19) fitted on said base frame (2) and having at least a work tool (20, 21, 22);
   second operating means (23, 24, 25) for positioning said at least one an operating head (17, 18, 19) and said wheel (R) in a work configuration wherein said at least a work tool (20, 21, 22) is arranged in contact against said tyre (P);
   on a first side of the grip unit, a first measuring portion (36) subject to a stress condition due to the contact between said at least a work tool (20, 21, 22) and said tyre (P), said first measuring portion (36) being magnetized; and
   on a second side of the grip unit, opposite the first side of the grip unit, and in correspondence to said first measuring portion (36), magnetostrictive sensors (37, 38)

suitable for detecting, by magnetostrictive effect, the stress condition of the first measuring portion (36), wherein said magnetostrictive sensors (37, 38) are distributed on a ring-shaped body (38) which is associated with said base frame (2) and are arranged substantially around said first measuring portion (36) so as to surround said first measuring portion (36), wherein said magnetostrictive sensors (37, 38) are operatively associated with at least a processing and control unit (39) suitable for determining a condition of danger of said tyre (P) starting from said stress condition.

2. Machine (1) according to claim 1, wherein said at least an operating head (17, 18, 19) comprises a first operating head, a second operating head, and at least a second measuring portion (42) subject to a stress condition due to the contact between said at least a work tool (20, 21, 22) and said tyre (P), in correspondence to said second measuring portion (42), second sensor means (43) being arranged which are suitable for detecting said stress condition of the second measuring portion (42) and are operatively associated with said processing and control unit (39).

3. Machine (1) according to the claim 2, wherein said second sensor means (43) comprise at least a sensor element selected from the list comprising: force transducers, load cells, piezoelectric sensors, piezoresistive sensors, strainmeters.

4. Machine (1) according to claim 2, wherein said machine (1) comprises third sensor means (44) which are suitable for detecting the angular position of said grip unit (3, 4, 5) revolving around said rotation axis (A) and are operatively associated with said processing and control unit (39).

5. Machine (1) according to claim 1, wherein said processing and control unit (39) is associated with signaling means (45) suitable for warning the operator against said condition of danger.

6. Machine (1) according to claim 1, wherein said processing and control unit (39) is associated with said first operating means (12) and said second operating means (23, 24, 25) and is suitable for controlling said at least one of said first operating means (12) and said second operating means (23, 24, 25) to prevent said condition of danger from aggravating.

7. Machine (1) according to claim 1, wherein, said machine (1) further comprises an encoder (44) suitable for detecting the angular position of said grip unit (3, 4, 5) revolving around said rotation axis (A) and is operatively associated with said processing and control unit (39), and said processing and control unit (39) is suitable for defining a maximum rotation speed of said grip unit (3, 4, 5) and for controlling said first operating means (12) so that the speed of said grip unit (3, 4, 5) does not exceed said maximum rotation speed.

8. Machine (1) according to claim 1, wherein said processing and control unit (39) is suitable for defining at least an end-stop position for said at least a work tool (20, 21, 22) and for controlling said second operating means (23, 24, 25) so that said work tool (20, 21, 22) does not go beyond said end-stop position.

9. Machine (1) according to claim 1, wherein said grip unit (3, 4, 5) comprises at least a retention head (3) of said rim (C) and a support shaft (4, 5) for supporting said retention head (3), wherein said shaft (4, 5) is associated with said base frame (2) by interposition of at least a proximal rotoidal bearing (6) and of a distal rotoidal bearing (7) and is split into a first section (4), which extends substantially between said rotoidal bearings (6, 7), and into a second section (5), which extends from said proximal rotoidal bearing (6) and supports said retention head (3), said first measuring portion (36) being arranged in correspondence to said second section (5) of the shaft (4, 5).

10. Machine (1) according to the claim 9, wherein said first measuring portion (36) is arranged in correspondence to said proximal rotoidal bearing (6).

11. Machine (1) according to the claim 1, wherein said ring-shaped body (38) comprises a plurality of axial cavities (41) in which said magnetostrictive sensors (37) are fitted.

12. Machine (1) according to the claim 1, wherein said magnetostrictive sensors (37) are distributed on said ring-shaped body (38) with a constant pitch.

13. Machine (1) according to the claim 12, wherein said magnetostrictive sensors (37) are four in number and are distributed at 90° on said ring-shaped body (38).

\* \* \* \* \*